US009407130B2

(12) United States Patent
Garcia et al.

(10) Patent No.: US 9,407,130 B2
(45) Date of Patent: Aug. 2, 2016

(54) WIRELESS MASSAGE, HEATING AND LIFT SYSTEM

(76) Inventors: Orsi R. Garcia, Bell Gardens, CA (US); Wenbin Song, Pomona, CA (US)

( * ) Notice: Subject to any disclaimer, the term of this patent is extended or adjusted under 35 U.S.C. 154(b) by 763 days.

(21) Appl. No.: 13/588,726

(22) Filed: Aug. 17, 2012

(65) Prior Publication Data
US 2013/0041297 A1 Feb. 14, 2013

Related U.S. Application Data

(63) Continuation-in-part of application No. 13/292,240, filed on Nov. 9, 2011.

(60) Provisional application No. 61/412,318, filed on Nov. 10, 2010.

(51) Int. Cl.
*A61H 23/02* (2006.01)
*A61H 1/00* (2006.01)
*H02K 33/16* (2006.01)
*H02K 9/22* (2006.01)

(52) U.S. Cl.
CPC ............... *H02K 33/16* (2013.01); *A61H 1/005* (2013.01); *A61H 23/02* (2013.01); *A61H 23/0218* (2013.01); *A61H 2201/0134* (2013.01); *A61H 2201/0149* (2013.01); *A61H 2201/0221* (2013.01); *A61H 2201/501* (2013.01); *A61H 2203/0431* (2013.01); *H02K 9/22* (2013.01)

(58) Field of Classification Search
CPC ....... A61H 23/00; A61H 23/02; A61H 1/005; A61H 2201/0207; A61H 2201/5007–2201/5015; A61H 2201/134; A61H 2201/0138–2201/1049; A61H 2203/0425–2203/1437; A61H 23/0218; A61K 33/16

See application file for complete search history.

(56) References Cited

U.S. PATENT DOCUMENTS

| | | | | |
|---|---|---|---|---|
| 4,157,088 | A * | 6/1979 | Gracey | 601/57 |
| 5,424,592 | A * | 6/1995 | Bluen | A47C 3/02 310/15 |
| 6,290,661 | B1 * | 9/2001 | Cutler et al. | 601/49 |
| 2003/0025366 | A1 * | 2/2003 | Barreiro, Jr. | 297/217.3 |
| 2003/0139693 | A1 * | 7/2003 | Swift | 601/15 |
| 2007/0179412 | A1 | 8/2007 | Imboden et al. | |
| 2008/0071200 | A1 * | 3/2008 | Rawls-Meehan | 601/46 |

(Continued)

FOREIGN PATENT DOCUMENTS

WO WO-03/003966 A2 1/2003
WO WO-2010/032902 A1 3/2010

OTHER PUBLICATIONS

Written Communication on the extended European search report from the European Patent Office issued on Mar. 24, 2016 in International Patent Application No. PCT/US201305534.

*Primary Examiner* — Valerie L Woodward
(74) *Attorney, Agent, or Firm* — Stefan Kirchanski; Matthew Spark; Zuber Law and Del Duca

(57) ABSTRACT

A massage device including a massage pad including a plurality of vibrating units, a plurality of heating elements, and/or a plurality of lifting actuators connected to a control box which accepts an input from a remote control associated with an action for at least one of the vibrating units, heating elements or lifting actuators and controls the vibrating units, heating elements or lifting actuators to perform the action is provided. Also provided are pre-programmed patterns of massage control actions, which may be input by a user using the remote control and/or a scripting language.

20 Claims, 15 Drawing Sheets

(56) References Cited

U.S. PATENT DOCUMENTS

| | | |
|---|---|---|
| 2008/0183113 A1* | 7/2008 | Kazerounian et al. .......... 601/99 |
| 2008/0214969 A1* | 9/2008 | Milne et al. .................... 601/15 |
| 2009/0193590 A1* | 8/2009 | Hata ................................. 5/713 |
| 2010/0320819 A1* | 12/2010 | Cohen et al. ................ 297/217.4 |
| 2011/0055720 A1 | 3/2011 | Potter et al. |
| 2012/0138067 A1* | 6/2012 | Rawls-Meehan ............. 128/845 |
| 2012/0209157 A1* | 8/2012 | Racine ............................ 601/99 |

* cited by examiner

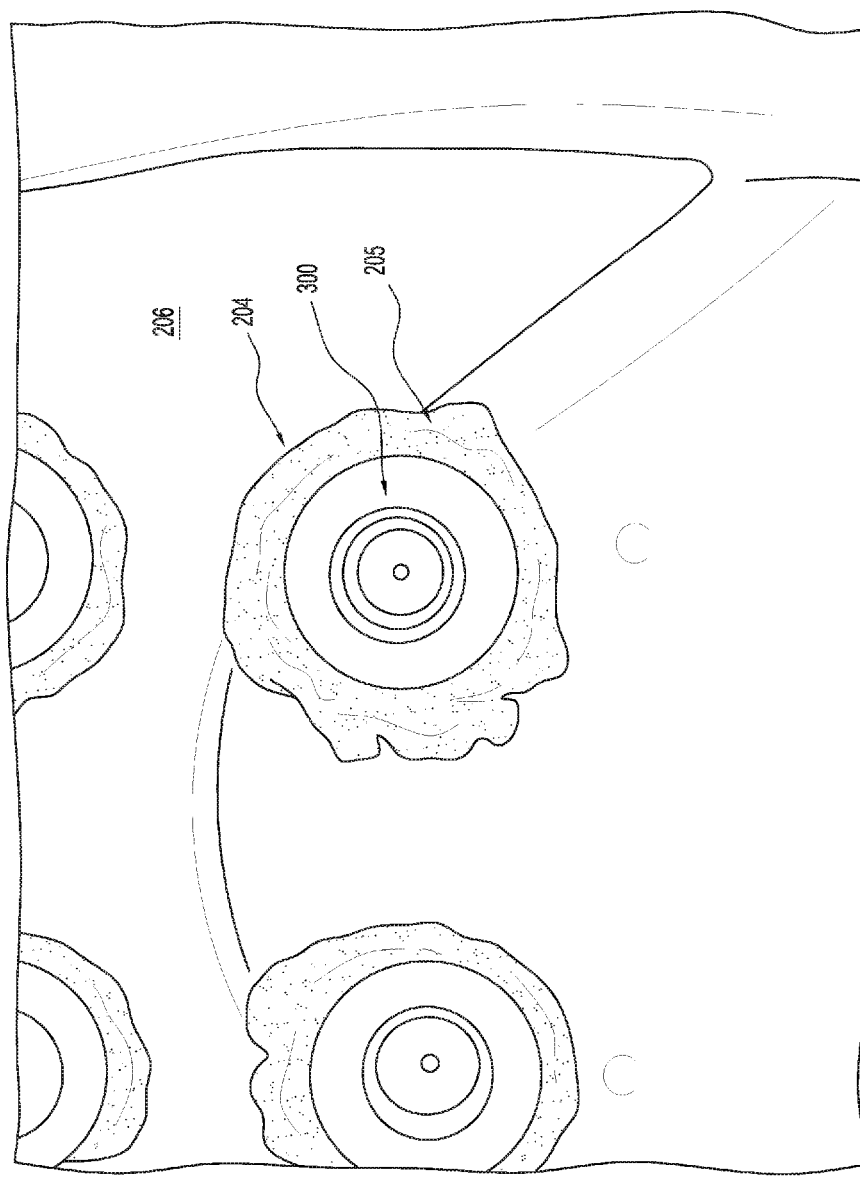

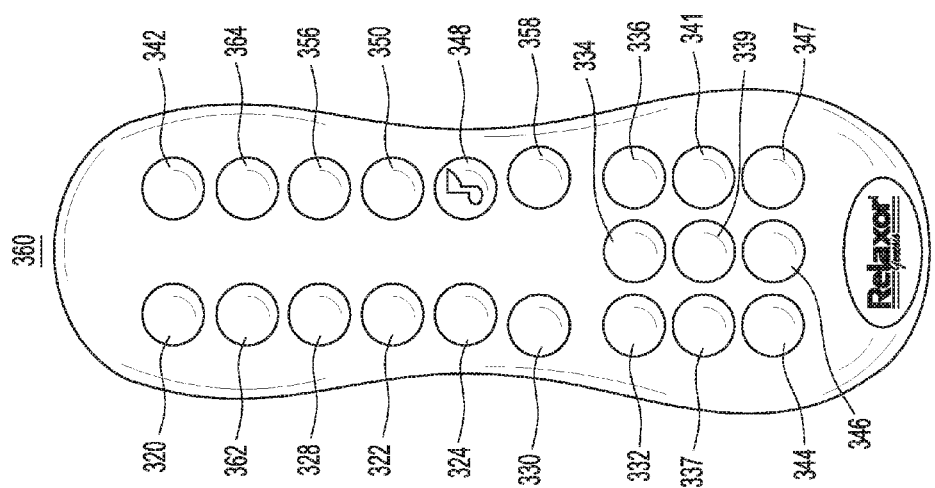

WIRELESS MASSAGE, HEATING AND LIFT SYSTEM

CROSS-REFERENCE TO RELATED APPLICATIONS

This application is a continuation-in-part of U.S. patent application Ser. No. 13/292,240, for "Vibrating Units", filed Nov. 9, 2011, by Song, et al., which claims the benefit under 35 U.S.C. §119(e) of U.S. Provisional Application No. 61/412,318, filed Nov. 10, 2010, the contents of which are incorporated by reference herein in their entireties.

BACKGROUND

1. Statement of the Technical Field

The embodiments disclosed herein relate generally to wireless remote control and touch sensing inputs for a massage, heating and lifting system.

2. Description of the Related Art

Vibrating units are widely employed in devices associated with numerous industries, particularly in consumer electronics, such as cellular telephones, gaming equipments, toys, clocks, massage equipment, etc. A typical vibrating unit can comprise an electric motor configured to rapidly spin an off-center weight. Such vibrating units typically generate undesirable, powerful radio signals in a wide frequency band, potentially leading to electromagnetic interference with other nearby electrical and electronic equipment. These vibrating units are also relatively heavy, and have low power efficiencies. A typical vibration unit may not be suitable for certain applications and environments, such as laboratories, hospitals, aircraft, etc., that have restrictions on power consumption, electromagnetic interference, and noise output.

Massage devices may incorporate vibrating, heating and lifting systems that allow for control of vibration frequency and/or amplitude, amount of heating, and movement of actuators for configuration.

There is a need for a wireless remote controller providing touch sensing input. Current universal remote control devices do not provide customized functions for controlling these features.

SUMMARY

A massage device including a massage pad further includes one or more vibrating units. The vibrating units are connected to a control box. The control box includes a connection to a power supply, a processor and associated electronic memory, and a communication interface. The processor and memory are configured to perform the steps of accepting an input from a remote control associated with an action for at least one of the vibrating units, and controlling the vibrating units to perform the action.

In another aspect of the invention, the massage pad further includes one or more heating elements, and one or more lifting actuators, and the vibrating units, heating elements and lifting actuators are connected to a control box. The processor and memory are further configured to perform the steps of accepting an input from a remote control associated with an action for the heating elements and/or lifting actuators, and these elements are then controlled to perform the action(s).

In various aspects of the invention, the remote control may be wired or wireless, and may be operated using control buttons or using touch sensors.

In one aspect, the remote control may be a smart phone device. In another aspect, the remote control may be a tablet device. In yet another aspect, the remote control may be a portable computing device.

In another aspect of the invention, a pre-programmed pattern of massage control actions is provided, which may include instructions for controlling the vibrating units, heating elements and/or lifting actuators. In an embodiment, a set of one or more pre-programmed patterns of massage control may be loaded onto the controller and/or the remote control. In another embodiment, the user may input a pattern of massage control using the remote control. In another embodiment, a pattern of massage control may be input to the controller using a scripting language.

BRIEF DESCRIPTION OF THE DRAWINGS

Embodiments will be described with reference to the following drawing figures, in which like numerals represent like items throughout the figures, and in which:

FIGS. 4A-4E show installation of an embodiment of a vibrating unit into a chair;

FIG. 6A, 6B and 6C show, respectively, profile and frontal views of a first embodiment of a remote control and a frontal of an alternative embodiment that are useful for understanding the present invention;

DETAILED DESCRIPTION

Figure 1A:
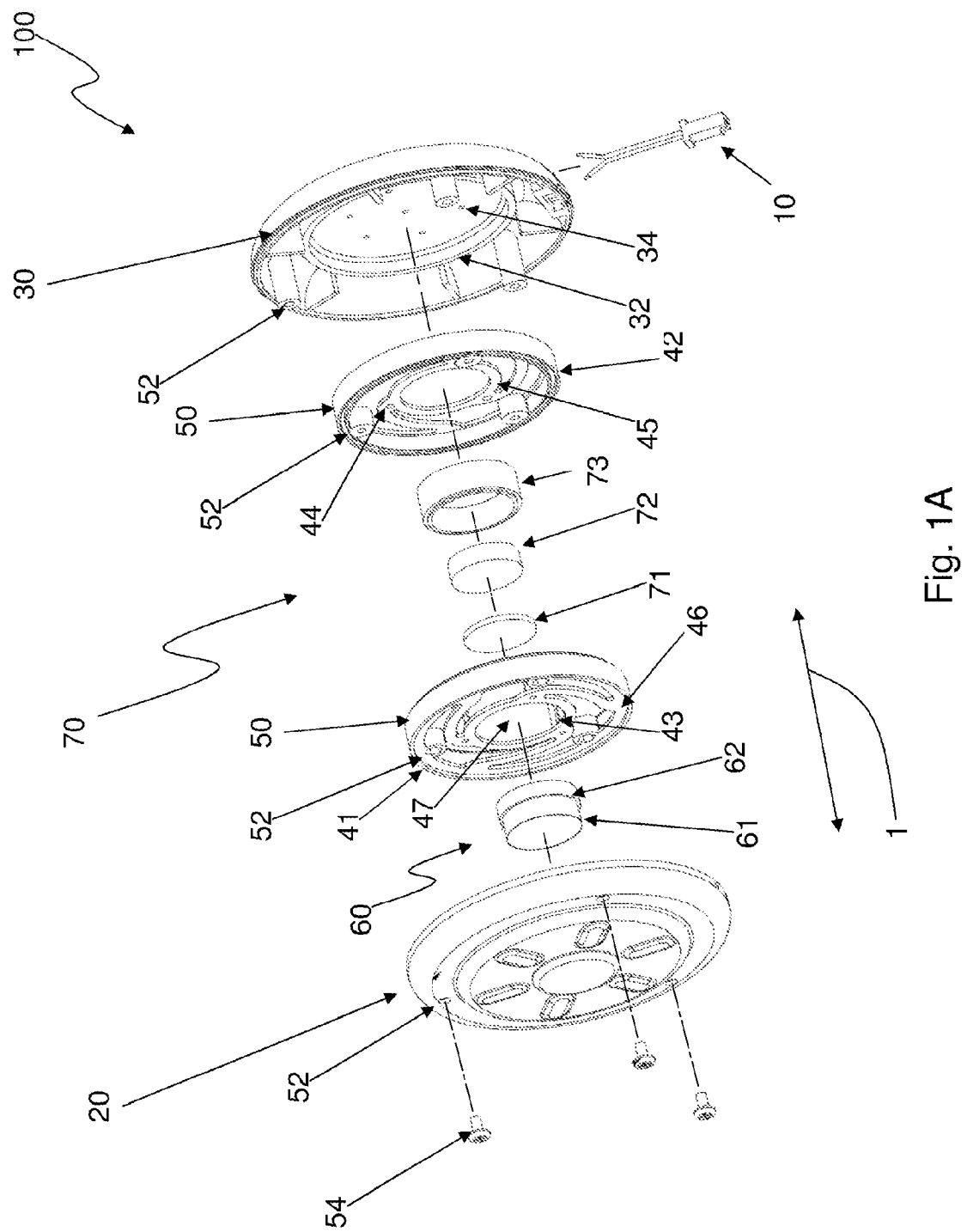
FIG. 1A is an exploded perspective view of an embodiment of a vibrating unit.
Figure 1B:
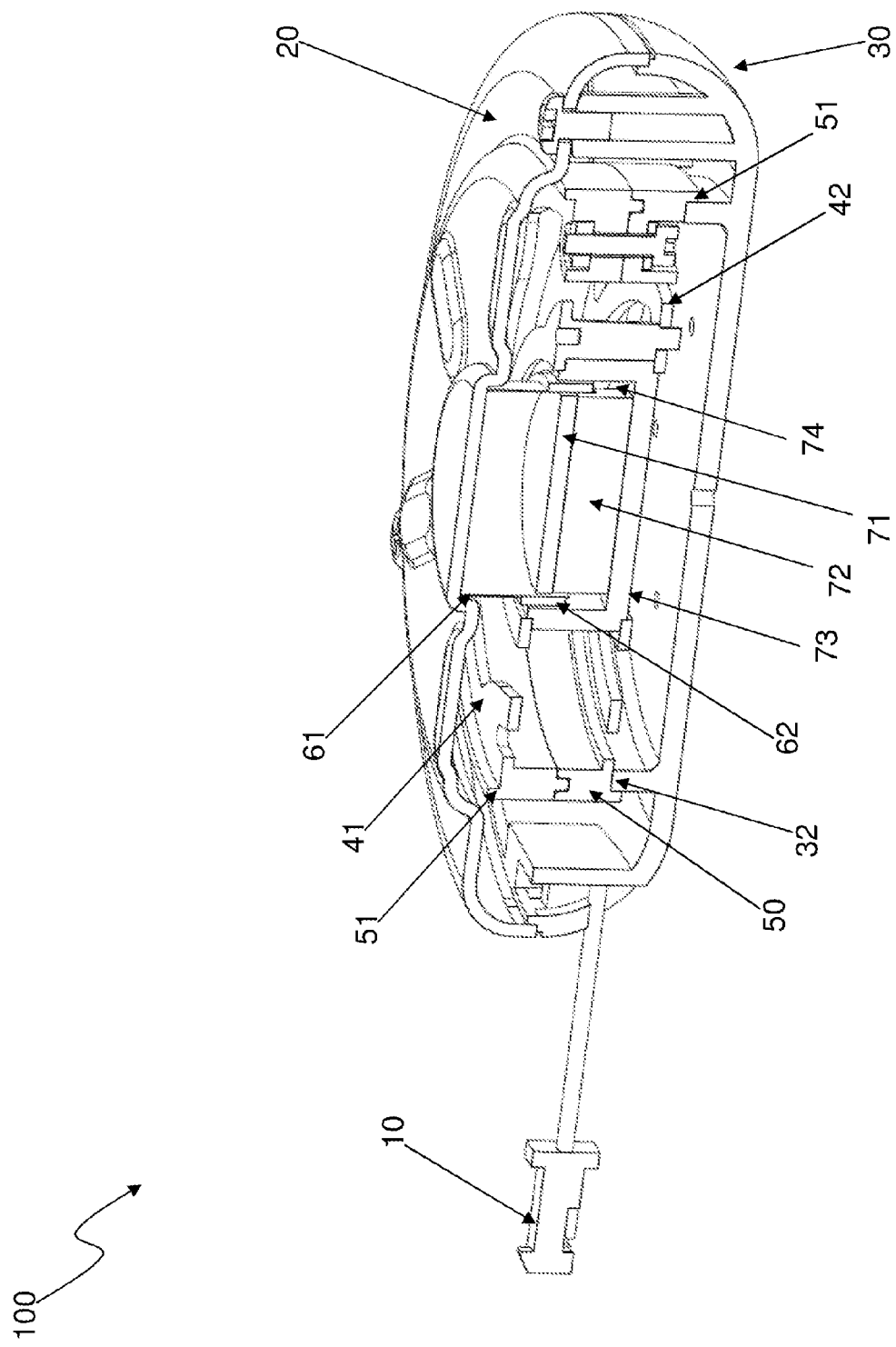
FIG. 1B is a perspective cross-sectional view of the unit shown in FIG. 1A.
Figure 1C:
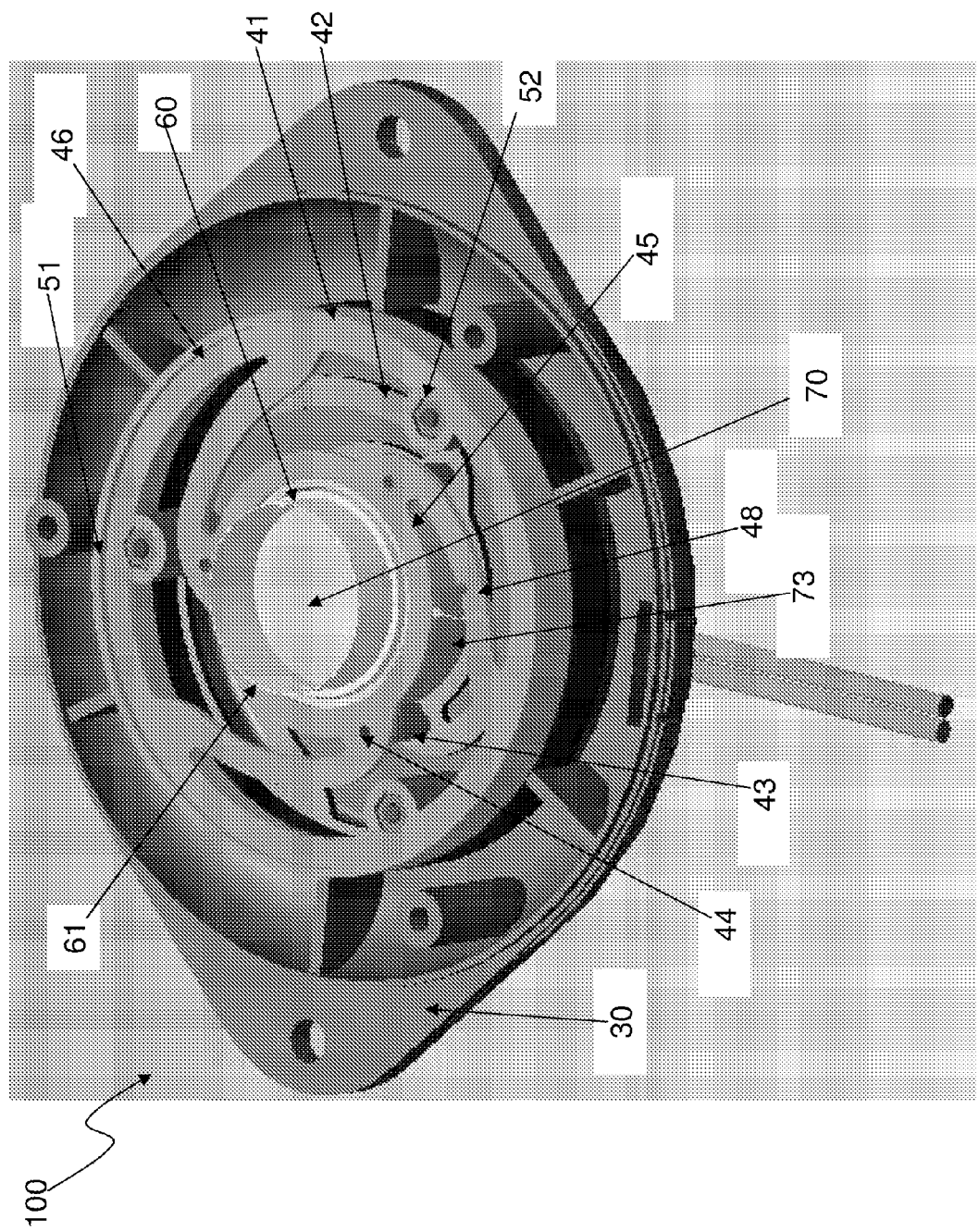
FIG. 1C is a perspective view of the unit shown in FIG. 1A without a back cover.

FIG. 1A is an exploded perspective view of an embodiment of a vibrating unit 100. FIG. 1B is a perspective cross-sectional view of the unit 100. FIG. 1C is a perspective view of the unit 100 without a back cover. In preferred embodiments the unit 100 is about 3 inches in length and about 1 inch in thickness. Alternative embodiments of the unit 100 can have other dimensions. The unit 100 comprises a terminal 10, a thermally conductive back cover 20, a front cover 30, a first spider 41, a second spider 42, spider mounts 50, a plurality of stand-off connectors 43, an electromagnetic coil 60, a pole plate 71, a magnet 72 and a yoke 73. The back cover 20 can be formed, for example, from aluminum material having a thermal conductivity of approximately 237 Watts/(meter-Kelvin). Together, the covers 20, 30 form a housing that encloses the majority of the other components of the device 100. As discussed in the following, adhesives or any other suitable methods may be used to mechanically couple the various components together; for purposes of the following discussion a combination of adhesives and screws or the like are used, but it will be appreciated that other means may be used to hold the various components together. The term "coupled," as used herein, is intended to denote both direct and indirect connections between two or more parts or components.

Figure 2:
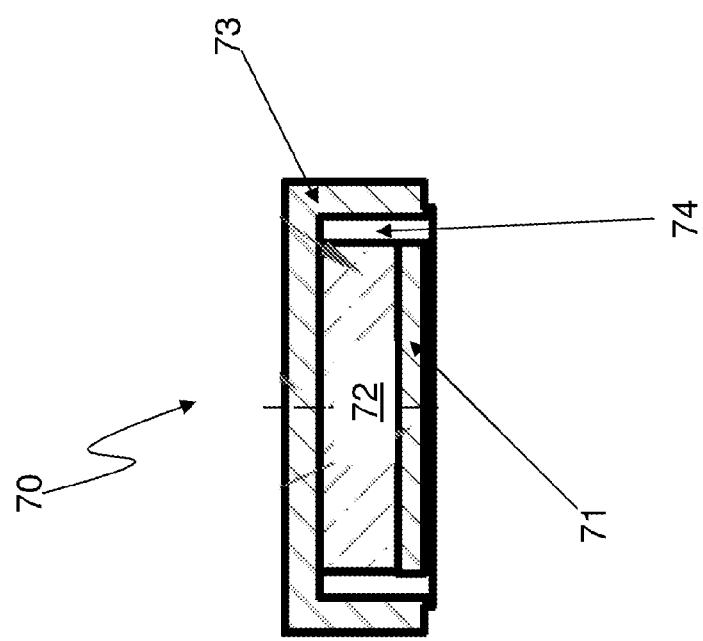
FIG. 2 is a side view of an embodiment of a motor assembly of the unit shown in FIGS. 1A-1C.

The pole plate 71, magnet 72, and yoke 73 form a motor 70 for the device 100. A side view of the motor 70 is shown in FIG. 2. The pole plate 71 is disposed on top of the magnet 72, and the combination is then disposed in a tubular space of the yoke 73, thereby forming an annular space 74. The width of the annular space 74 is greater than the thickness of the front portion 62 of the magnetic coil 60. Thus, the front portion 62 of the magnetic coil 60 may ride within the annular space 74. The components 71, 72, 73 of the motor 70 may be adhered together using a suitable adhesive. Other suitable means for coupling the components 71, 72, 73 can be used in the alternative. The pole plate 71 substantially limits the magnetic flux in the side directions, and tightly constrains the magnetic loops. Consequently, stray magnetic flux is kept to a minimum. The pole plate 71 may be made, for example, from 1010 steel with a zinc plate coating. The magnet 72 may be, for example, a neodymium-iron-boron magnet with a nickel plate coating. The yoke 73 may be made, for example, from 1010 steel with a zinc plate coating.

Figure 3:
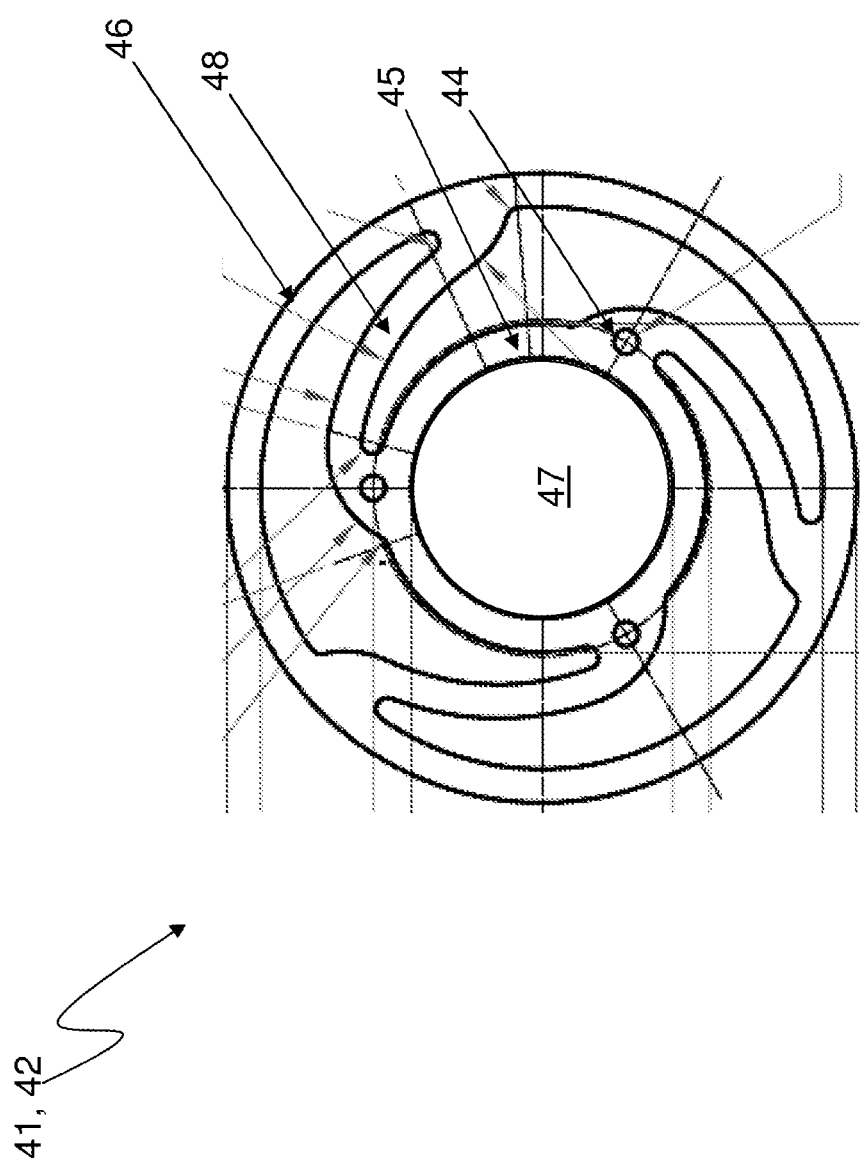
FIG. 3 is a top plan view of an embodiment of a spider of the unit shown in FIGS. 1A-1C.

As further illustrated in FIG. 3, which is a top view of spiders 41, 42, each spider 41, 42 comprises an aperture 44 for coupling the spider 41, 42 to an end of a corresponding stand-off connector 43. Three stand-off connectors 43 are employed, at 120 degree angles to each other with respect to the top view of the spider 41, 42. More, or less than three stand-off connectors 43 can be used in alternative embodiments. The stand-off connectors 43 may be screwed onto the spiders 41, 42. The stand-off connectors 43 thus mechanically couple the spiders 41, 42 together, but keep a predefined distance between the spiders 41, 42, which may be the height of the yoke 73 or slightly greater. The spiders 41, 42 have internal regions 45 that are elastically coupled to external regions 46 by way of flexible arms 48 between the two regions 45, 46. The connectors 43 preferably are coupled to the internal regions 45.

The external region 46 of each spider 41, 42 is coupled to a corresponding surface on a respective spider mount 50, by a suitable means such as adhesive. Alternatively, each spider 41, 42 can be integrally formed with its corresponding mount 50. Each spider mount 50 includes a plurality of housing connectors 52, which align with corresponding housing connectors 52 on the other spider mount 50 as well as on the front cover 30 and back cover 20. Screws 54 can thread through all corresponding housing connectors 52 to couple the back housing 20, front housing 30, and spider mounts 50. When coupled, the front housing 30 and back housing 20 form a housing for the unit 100 that keeps out debris, facilitates mounting of the device 100, and results in acoustic effects that are believed to increase the vibrations generated by the motor and allow the motor to operate at higher power levels than otherwise would be possible.

The yoke 73 is coupled to the internal region 45 of each of the first spider 41 and the second spider 42 by a suitable means such as adhesive. For example, a back surface of the yoke 73 is coupled to the first spider 41, and a front surface of the yoke 73 is coupled to the second spider 42. The spiders 41, 42 thus sandwich the motor 70, and provide an elastic suspension system that allows movement of the motor 70 along a longitudinal axis 1 to create vibration. The spiders 41, 42 can be made, for example, from nylon. As another example, the spiders 41, 42 can be made from nylon plastic with glass reinforcing, to provide tensile strength to the spiders 41, 42 while permitting the spiders 41, 42 to flex.

As discussed above, the spiders 41, 42 are coupled to respective spider mounts 50. Each spider mount 50 has a ring surface 51 that couples to the external regions 46 of the corresponding spider 41, 42. For example, the external regions 46 of the spiders 41, 42 may be adhered to the respective ring surfaces 51. Alternatively, if the spider 41, 42 is integrally formed with its corresponding mount 50, then the ring surface 51 simply defines the outer region 46 of each spider 41, 42. Using the spiders 41, 42, the motor 70 may thus vibrate within, and even slightly beyond, the space defined between the combined ring surfaces 51 of the spider mounts 50. The second spider 42 can also be coupled to the front cover 30 in a manner analogous to that used for the spider mounts 50, i.e., the internal surface of the front cover 30 can have a ringed surface 32 onto which the outwardly-facing external region 46 of the second spider 42 can be attached by a suitable means such as adhesive. As noted above, the front cover 30 can also be coupled to the spider mounts 50 and the back cover 20 via screws 54. Also, as illustrated in FIG. 1B, the spiders mounts 50 can be configured with corresponding tongue-and-groove geometries or similar mechanical engaging shapes, such as pins and recesses or the like, so that each spider mount 50 mechanically engages and locks with the other spider mount 50.

A rear portion 61 of the electromagnetic coil 60 is coupled to the back cover 20, such as with adhesives. A terminal 10 has wires that extend from the front cover 30 and are electrically connected to the electromagnetic coil 60. It will be appreciated, however, that any suitable electrical connector may be used to provide power to the electromagnetic coil 60. The first spider 41 has a central opening 47 through which the electromagnetic coil 60 passes to connect with the back cover 20. As discussed above, the front end 62 of the electromagnetic coil 60 rides within the annular space 74 of the motor 70. The back cover 20 supports the electromagnetic coil 60 assembly and is directly thermally coupled to the electromagnetic coil 60. Additionally, because the back cover 20 is made of thermally conductive metal, it serves as both a heat sink and a radiator for the heat generated by the electromagnetic coil assembly 60. The front cover 30 prevents external objects from getting inside and blocking the vibrating motor 70, but includes a plurality of apertures 34 sized to permit the movement of air into and out of the device 100. The front cover 30 may be made from polycarbonate materials. As noted earlier, the back cover 20 is also coupled to the spider mounts 50 by a suitable means such as screws 54, and may also be coupled to the external region 46 of the first spider 41 by a suitable means such as adhesives.

The following points may be noted in view of the above-described structure of the vibrating unit 100. First, the front cover 30 and the back cover 20 are rigidly connected to each other and the spider mounts 50. Similarly, the external regions 46 of the spiders 41, 42 are rigidly connected to their respective spider mounts 50, and hence are rigidly connected to the front cover 30 and the back cover 20. Similarly, the electromagnetic coil 60 is rigidly connected to the back cover 20 by way of its rear portion 61, and hence the electromagnetic coil 60 is substantially rigidly connected to the spider mounts 50, apart from some slight flex that may be imparted by the back portion 61 due to the mechanical limits of the materials used; this flex can kept to a minimum. The motor 70, on the other hand, is elastically connected to the spider mounts 50 by way of the internal regions 45 of the spiders 41, 42. Hence, whereas the majority of the components of the device 100 are rigidly connected to each other, the motor 70 elastically rides within the spider mounts 50 on the suspension system provided by the spiders 41, 42. The motor 70 and the electromagnetic coil 60 electromagnetically couple with each other to drive the motor 70 to vibrate within the spider mounts 50. Further, during operations, because the back cover 20 is made of a thermally conductive metal, such as aluminum, or any other suitable thermally conductive material, heat generated by the electromagnetic coil 60 is rapidly conducted to the back cover 20 and radiated away, thereby cooling the unit 100. The back cover 20 thus serves to both protect the motor 70 from dust and debris and to keep the unit 100 cool.

The unit 100 is able to accept low power signals to provide the desired vibration; for example, the input power signal may be a low-frequency 2.5 volt sine wave. In preferred embodiments the electromagnetic coil 60 has a D.C. resistance of 4.1 ohms, .+−0.5%. The electromagnetic coil 60 may have a coil with a Kapton bobbin and a kraft belt. The coil may be wound with a single wire that creates 4 layers with, for example, 66 turns on each layer. The electromagnetic coil 60 provides a magnetic force suitable to move the vibrating motor 70.

The vibrating motor 70 employs complete magnetic loops. The electromagnetic coil 60 is positioned such that the magnetic in the longitudinal direction (indicated by the arrow 1) passes through the motor 70. When a signal powers the electromagnetic coil 60, the electromagnetic coil 60 generates a magnetic force on the vibrating motor 70 and moves the vibrating motor 70 in and out along the annular space 74. The spiders 41, 42 hold the vibrating motor 70 and also provide a resilient force to bring the vibrating motor 70 back to an initial position when the signal is gone. The spider mounts 50 hold the spiders 41, 42 as a suspension system and couple to the housing provided by the back 20 and front 30 covers. When a continuous, oscillating signal drives the electromagnetic coil 60, the signal forces the vibrating motor 70 to move back and forth. The spiders 41, 42 pass such movement to the housing formed by the covers 20, 30, and cause the housing to move in the other direction. The housing thereby provides a convenient means for mounting the device 100 whereby vibrations generated by the device 100 can be transferred to the structure surrounding the device 100.

The rapid movements of the vibrating motor 70 also force air in and out of the housing via the apertures or openings 34 in the front cover 30, which causes an additional vibration effect along the longitudinal direction 1. More specifically, the back and forth movement of the vibrating motor 70 within the housing pumps air into and out of the housing via the openings 34. The openings 34 can be sized so that the openings restrict the airflow, thereby causing back-pressure to build up within the housing. The back-pressure is believed to increase the reactive force generated between the vibrating motor 70 and the housing, thereby increasing the overall level of vibration generated by the device 100.

Moreover, it is believed that the back-pressure within the housing helps to dampen or reduce the maximum excursion of the vibrating motor 70 in relation to the electromagnetic coil 60. Thus, the device 100 can operate at relatively high power levels, and can thereby generate higher vibration levels, without damage to the vibrating motor 70, electromagnetic coil 60, or other components caused by excessive excursion of the vibrating motor 70. For example, it is believed that embodiments of the device 100 can operate without damage at a power input of approximately five Watts, while comparable devices without a housing are limited to approximately three Watts of input power, and fail at a power input of approximately five Watts.

The housing formed by the covers 20, 30 also prevents external objects from moving into the unit 100, thereby preventing jamming of the motor 70 while also allowing air to be pumped in and out smoothly, and simultaneously cools the unit 100 via conductive and radiative effects of the back cover 20.

The above-described vibrating device 100 provides a compact, lightweight and energy-efficient source of highly directional vibratory energy, vibrating at about 50 Hz or any low frequency (such as less than 100 Hz) and requiring very low power signals (such as 2.5 Watts at 0.6 amp). Moreover, because of the design of the vibrating motor 70, there is almost no electromagnetic interference with other equipment. As such, the embodiments of the vibrating device 100 are ideally suited for certain environments with requirements of low weight, low power, high power efficiency, and low electromagnetic interference, such as hospitals, aircraft and the like.

A motor substantially similar to the motor 70 constructed and evaluated. In particular, an accelerometer was mounted on the top of the motor, and the motor was operated using an AC (alternating current) voltage input of approximately 3.5 Volt rms (root mean square) at approximately 55 hertz. The maximum vibration generated by the motor was measured by the accelerometer as approximately 7.6 G (unit of acceleration caused by gravity). A conventional motor of comparable size was operated using substantially the same voltage, and an accelerometer mounted on top of the conventional motor measured the maximum vibration level as approximately 6.4 G rms. Thus, the motor constructed in accordance with the inventive concepts disclosed herein was approximately 20 percent more efficient at generating vibrations than the conventional motor.

Figure 4A:
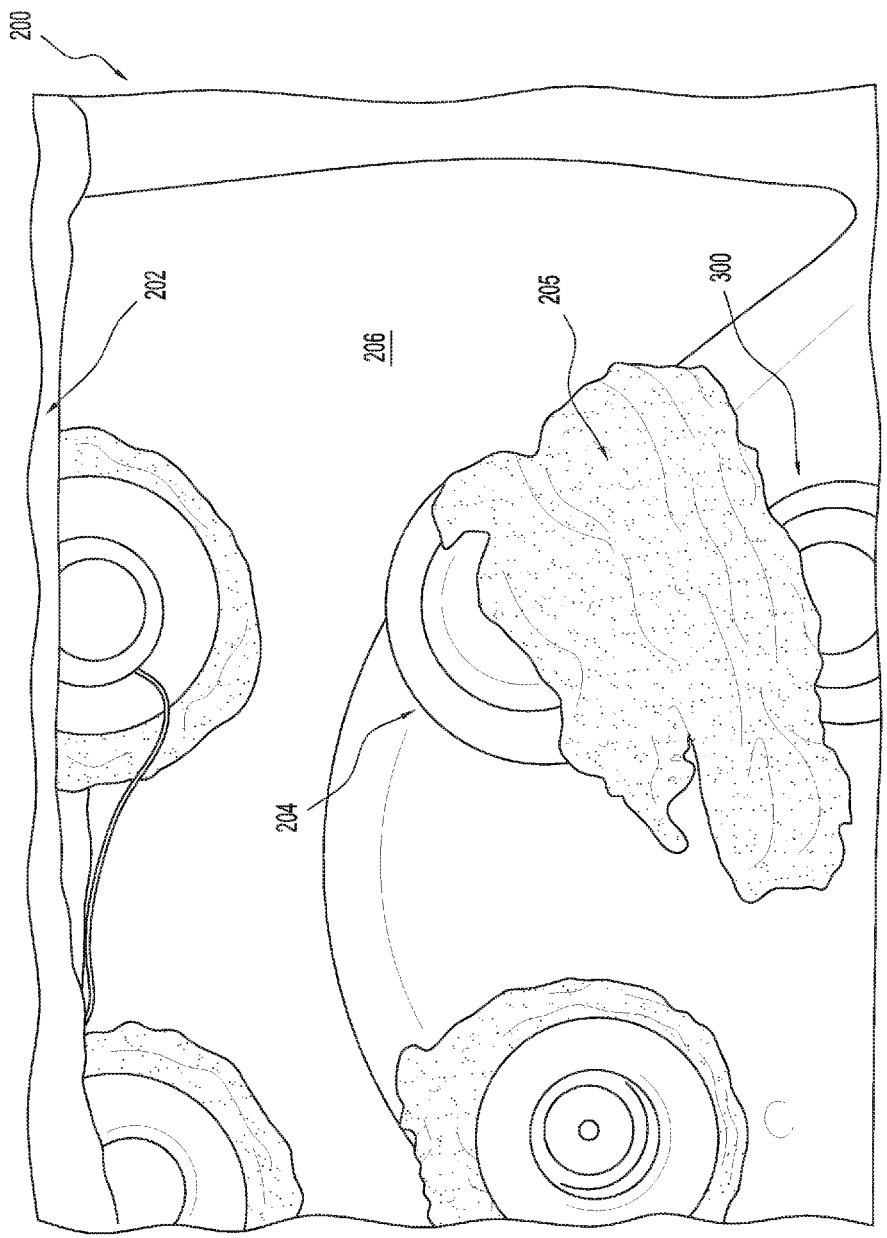
Figure 4B:
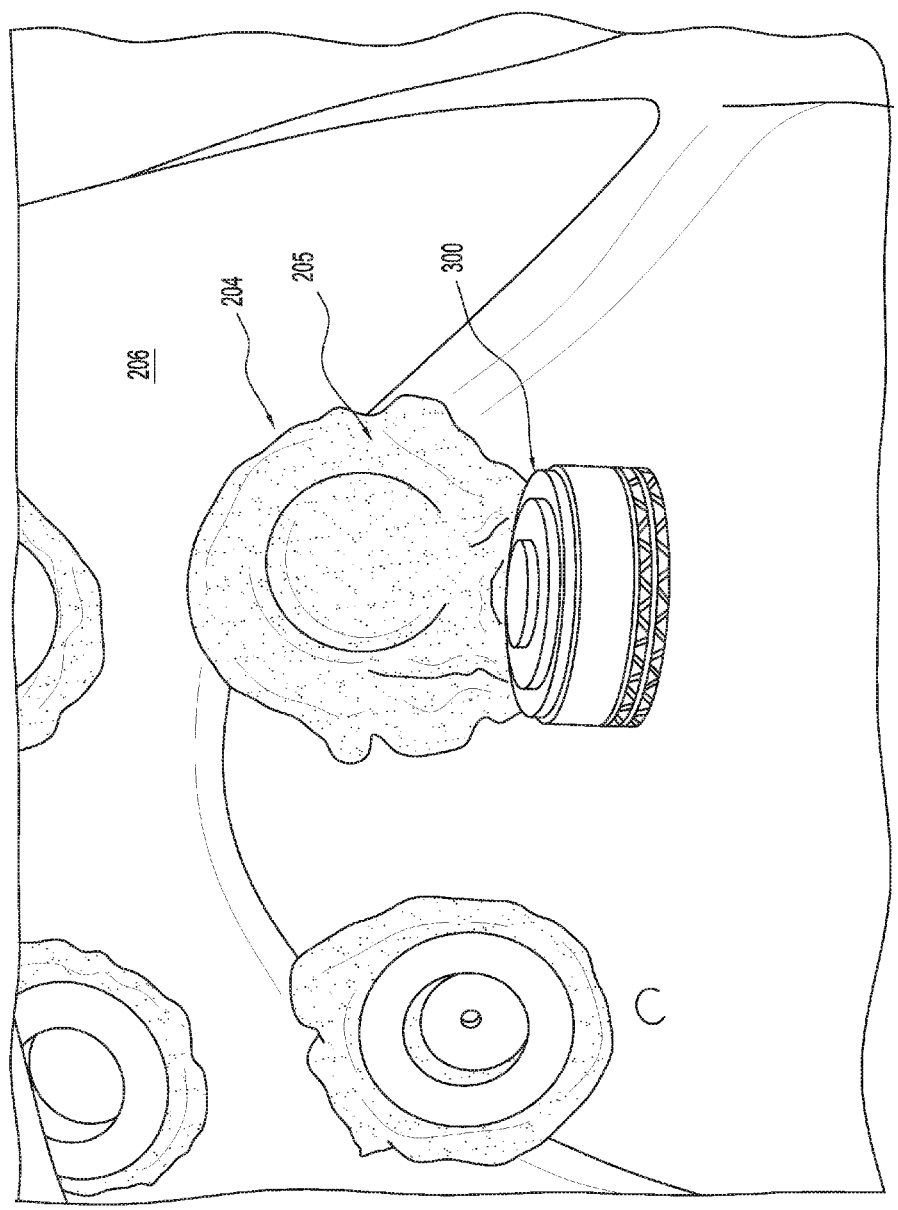
Figure 4D:
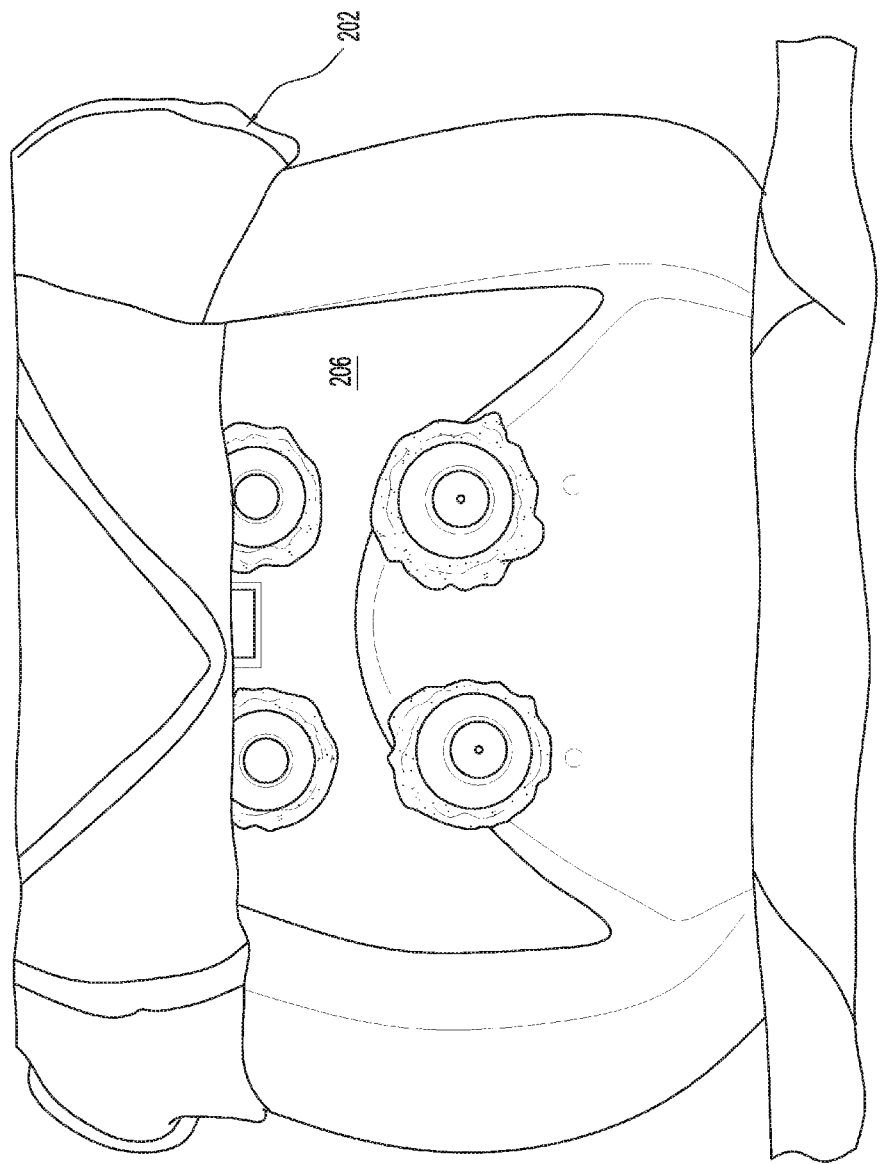
Figure 4E:
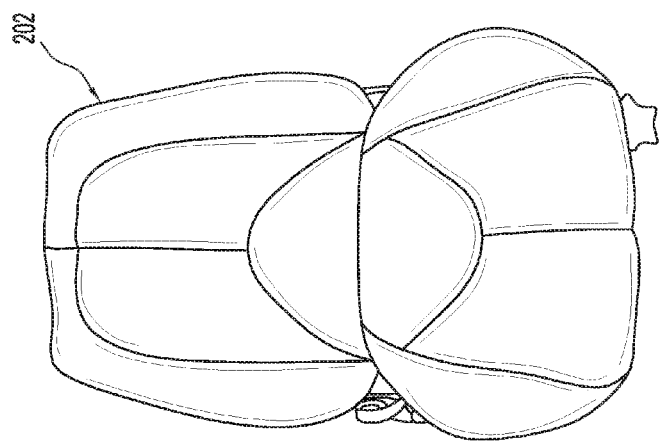

By way of example, FIGS. 4A-4E illustrate the mounting of embodiments of vibrating units 300, similar to the vibrating unit 100, into a chair 200. As shown in FIG. 4A, the cover 202 of the chair 200 may first be removed. A hole 204 may then be cut into the seat cushion 206 of the chair 200 at a location where the vibrating unit 300 is desired. It may be desirable to ensure that the hole 204 is large enough to leave adequate room for the installation of wiring and the insertion of insulating material 205 for the vibrating unit 300. As shown in FIG. 4B, wiring and insulating material 205 may be installed into the hole 204 of the seat cushion 206. As shown in FIG. 4C, the vibrating unit 300 may then secured within the hole 204 in the seat cushion 206, nestled within the insulation material 205. Finally, as shown in FIG. 4D, the seat cover 202 may be replaced over the seat cushion 206, with a completed seat 200 shown in FIG. 4E.

Figure 5:
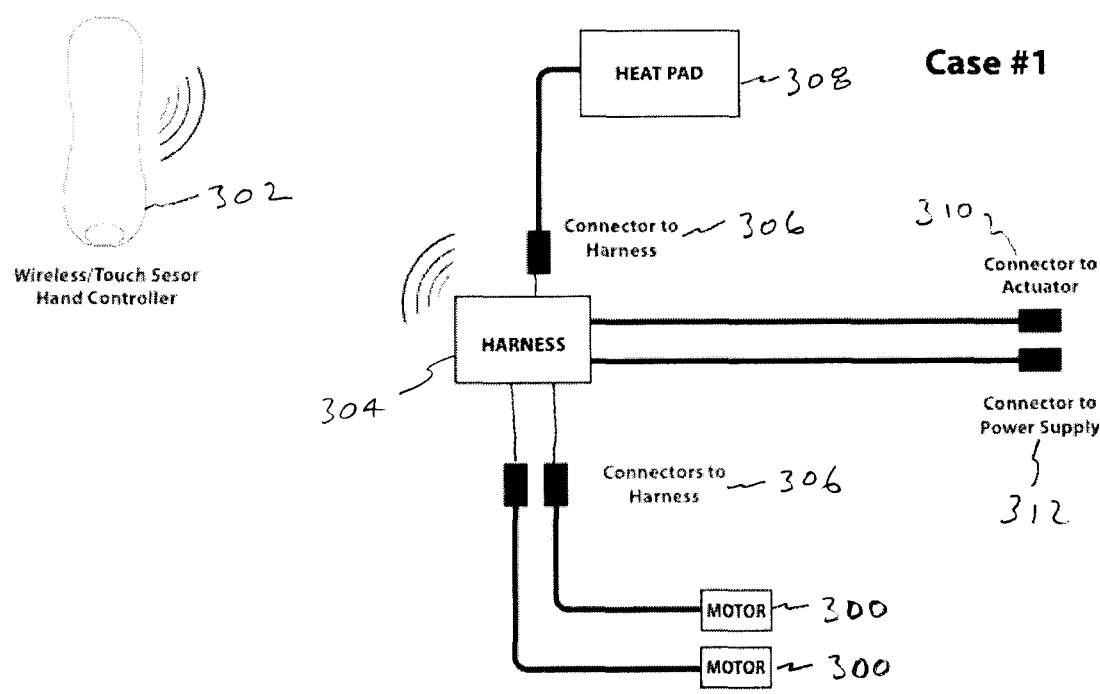
FIG. 5 is a block diagram of a system that is useful for understanding the present invention.

Referring now to FIG. 5, a remote control system is also provided in an embodiment of the invention. The remote control system is configured to control the vibrating units 300 and, additionally, any heating 308 and lifting systems 310 which, for example, may be associated with a massage pad or other device incorporating the vibrating units 300. It is understood that the remote control system described herein may alternatively be used to control vibrating units that differ from those described herein.

The remote control system includes a remote controller 302, a control box 304 with vibrating units/massage transducers 300, heating elements 308 and lifting actuators 310 or any combination of these as useful in controlling massage, heating and lifting accessories. In an embodiment, the remote controller 302 communicates with the control box 304 via wireless communication technology (as IR or RF). The controller is preferably a remote control unit 302 that could be a customized control wand or a wireless device with customized software. The wireless device may be a smart phones, tablets or computer, without limitation. In another embodiment, the remote control 302 may communicate with the controller 304 using a wired interface featuring connectors 303*a*, 303*b*.

Also in an embodiment, touch sensing input methods may be used in the particular customized control wand 302. Usable touch sensing input methods include, but are not limited to, resistance touch sensing, capacitive touch sensing, pressure touch sensing and lighting reflection touch sensing. Various embodiments of the invention are represented by exemplary cases depicted in FIGS. 5, 7 and 9. These examples are not intended to cover all potential variations.

Case one, depicted in FIG. 5, shows a customized wireless remote controller 302 with touch sensing, a wireless control box 304 with vibrating units 300, heating elements 308 and lifting actuators 310.

In a preferred embodiment, the wireless remote controller 302 has capacity touch sensors, a Bluetooth transceiver, microprocessors, relative circuitry, and a power supply, such as, but not limited to, one or more batteries. The capacitive touch sensors are located under a top case. A microprocessor or a processing circuitry reads the sensors capacitance. Any finger touches on the surface of top case causes sensors capacitance changes. A processor notifies the changes and translate the changes to inputs, sending the corresponding commands to the control box 302 via a Bluetooth transceiver.

The control box 302 is also equipped with a Bluetooth transceiver, a processor and control circuitry to operate massage transducers 314, heating elements 308 and lifting actuators 310. When the Bluetooth transceiver receives commands from the remote controller 302, a processor translates the commands to certain operating patterns to perform the massage, heating and lifting functions. The control box also includes a connector to a power supply 312. The processor operates in conjunction with associated electronic memory, the processor and memory configured to perform the necessary functions, including but not limited to translation and command functions.

Figure 6B:
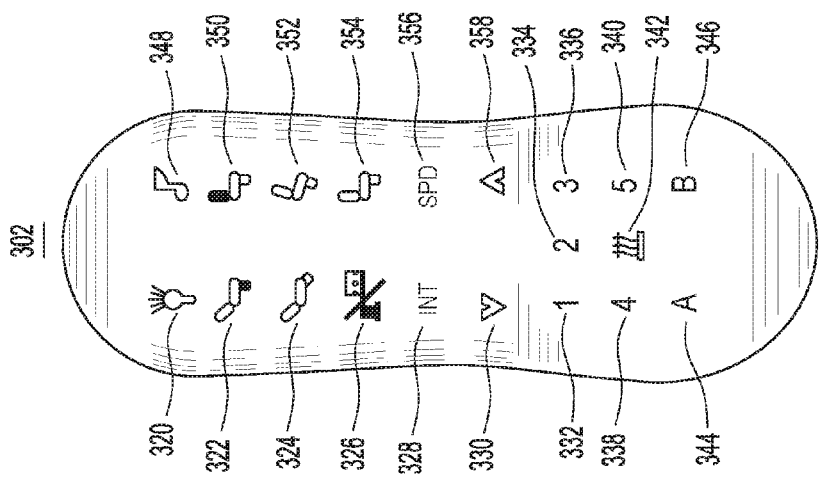
Figure 6A:
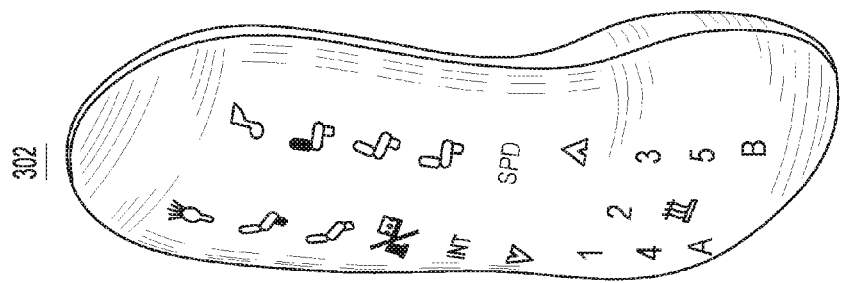

An exemplary wireless touch remote control 302 is depicted in FIGS. 6A and 6B. In an embodiment of the invention directed to a massage pad with built-in vibrating units 300, heating unit 308 and lifting systems 310 to place the massage pad in a desired position, remote control 302 includes touch controls 320-358 for controlling a variety of functions. These functions are referred to herein collectively as "massage control actions". For example, control/buttons are provided for flash lighting 320, leg actuator selection 322, reclining 324, vibration and heat enable/disable 326, vibration intensity 328, actuator down/vibration intensity down/vibration speed down 330, vibration zone 1 enable/disable 332, vibration zone 2 enable/disable 334, vibration zone 3 enable/disable 336, vibration zone 4 enable/disable, vibration zone 5 enable/disable, heating enable/disable 342, addition A enable/disable 344, addition B enable/disable 346, audio mode enable/disable 348, back actuator selection 350, chair lifting 352, chair returning 354, vibration speed 356, actuator up/vibration intensity up/vibration speed up 358, massage wave mode 362, massage pulse mode 364.

An embodiment of a wireless remote control wand 360 is depicted in FIG. 6C. As with the remote control 302 depicted in FIGS. 6A and 6B, the control wand may include touch controls 320-358 for controlling massage control actions, such as, but not limited to flash lighting 320, back actuator selection 322, both actuator selection 324, vibration and heat enable/disable 326, vibration intensity 328, actuator down/vibration intensity down/vibration speed down 330, vibration zone 1 enable/disable 332, vibration zone 2 enable/disable 334, vibration zone 3 enable/disable 336, vibration zone 4 enable/disable 337, vibration zone 5 enable/disable 339, vibration zone 6 enable/disable 341, heating enable/disable 342, addition A enable/disable 344, addition B enable/disable 346, addition C enable/disable 347, audio mode enable/disable 348, leg actuator selection 350, chair lifting 352, chair returning 354, vibration speed 356, actuator up/vibration intensity up/vibration speed up 358.

Figure 7:
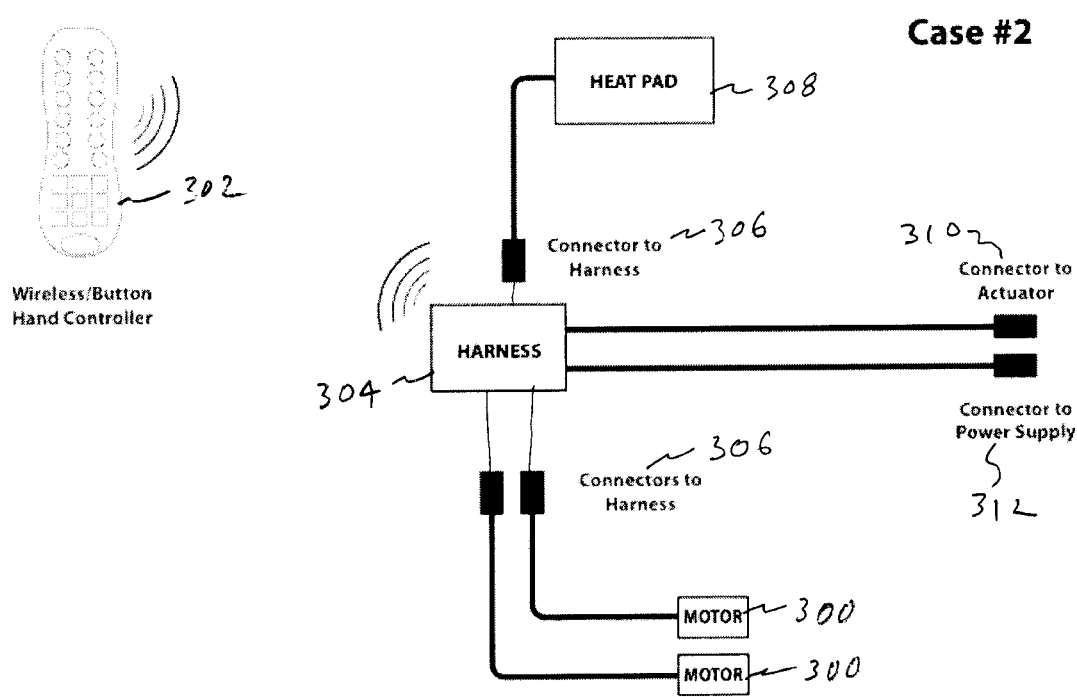
FIG. 7 is a block diagram of a system that is useful for understanding the present invention; and, FIG. 8 is a block diagram of a system that is useful for understanding the present invention.

Case two, depicted in FIG. 7, includes a customized wireless remote controller 302 with physical buttons instead of touch controls, a wireless control box 304 controlling vibrating units 300, heating elements 308 and lifting actuators 312. The use of buttons instead of touch controls may be preferable for some persons. In other aspects, exemplary case two operates in a similar fashion to case one. The wireless remote controller has capacity a key pad, a Bluetooth transceiver, microprocessors and relative circuitry. A microprocessor reads the key pad inputs. A microprocessor send correspond commands to control box 304 via Bluetooth transceiver.

Again, the control box 304 is powered through a connector to a power supply 312, has a Bluetooth transceiver, a processor and control circuitry to operate vibrating units 300, heating elements 308 and lifting actuators 310. When the Bluetooth transceiver receives commands from the remote controller, a processor translate the commands to certain operating patterns to perform the massage, heating and lifting functions.

Figure 8:
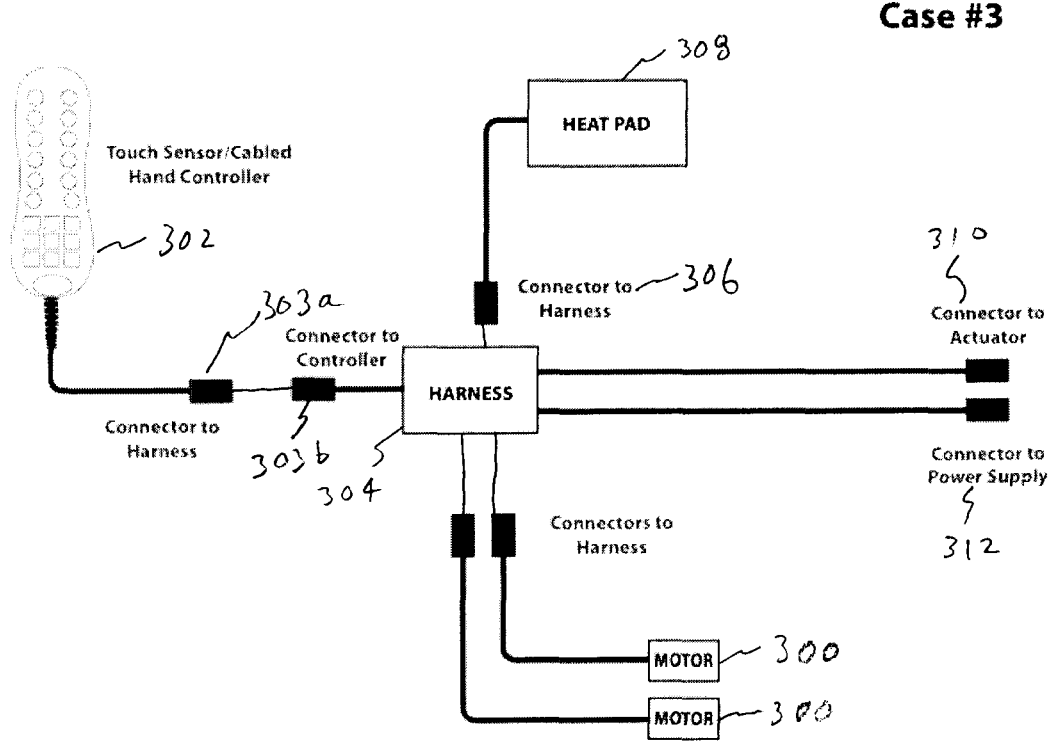

Case three, as presented in FIG. 8, includes a customized wired remote controller 302 with capacitive touch sensor and a wired interface to the control box 304 using connectors 303*a*, 303*b*. The control box 304 accepts input from the remote controller 302 to controlling vibrating units 300, heating elements 308 and lifting actuators 312. The use of a wired controller instead of a wireless controller may be preferable in some instances, such as where wireless signals are not desired or susceptible to excessive electrical noise. In other aspects, exemplary case three operates in a similar fashion to cases one and two.

An audio mode is provided in one embodiment, in which a microphone associated with the remote controller 302 or the control box 304 receives audio signals, which the control box then uses to adjust the frequency and intensity of the vibrating units 300 in order to provide a user with a rich experience—the user can feel the music from an audio source, which may be a game, movie, etc.

In an embodiment of the invention, a pre-programmed pattern of massage control actions may be selected. As an example of a pre-programmed pattern of massage control, it may be desirable to a user for the vibrating units 300 and heating elements 308 to start at a low vibration setting/a high heat setting for several minutes, then slowly increment/decrease to a high vibration/low heat over some period of time. A pre-programmed pattern of massage control may include controls for all or any of the vibrating units 300, heating elements 308 and lifting actuators 310.

In certain embodiments of the invention, one or more pre-programmed patterns of massage control may be provided already programmed into the control box 304 or onboard the operative memory and/or processor of the remote controller 302. In this case, the user may select a pre-programmed pattern of massage controls using the remote controller 302, and the control box then operates the vibrating units 300, heating elements 308 and lifting actuators 310 according to the selected pattern.

In another embodiment, the user may input their own pattern of massage controls using the remote controller 302. For example, the remote controller may provide a simplified user interface comprising a series key inputs for creating a pattern of massage controls, allowing the user to input the desired actions and their timings, and allowing the input pattern to be saved and/or sent to the control box 304 for execution.

In one embodiment, the pre-programmed pattern of massage controls may be in the form of a scripting language. A simplified example script might read as follows:

```
START
    LOWER LIFTING ACTUATORS
    HEAT=1
    VIBRATE=1
    WAIT (10 MINUTES)
        HEAT = 5
        VIBRATE = 5
    WAIT (10 MINUTES)
        HEAT = 0
        VIBRATE = 0
END
```

Upon execution, this script would instruct the control box 304 to first lower the lifting actuators 310, then set the heating elements 308 on "1" (low heat) and the vibrating units 300 on "1" (low vibration), wait for 10 minutes, then set the heating elements 308 on "5" (medium heat) and the vibrating units 300 on "5" (medium vibration) for 10 minutes, then turn them off. It will be understood by those of skill in the controller arts that the scripting language may provide for appreciably different syntax, numeric values, etc., while still accomplishing the same objective of providing instructions for the control box 304.

Of course, any suitable scripting language may be used. Additionally, it is envisioned that a written or verbal natural language processor may be employed to allow a user to input a script using a natural written or spoken language, such as English.

In one embodiment of the invention, the user may input their own pattern of massage controls using a personal computer ("PC") or similar device, such as, but not limited to, a notebook or tablet PC. The input pattern of message controls, which may be in the form of a script or other visual portrayal of massage controls, may then be forwarded from the PC to either a remote controller 302 or directly to the control box 304 for execution.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the following claims.

We claim:

1. A massage device comprising:
a pad comprising one or more vibrating units comprising:
a housing comprising a top portion and a bottom portion, wherein at least one of the portions is formed from a thermally conductive material;
a cylindrical electromagnetic coil mechanically and thermally coupled to a thermally conductive portion of the housing projecting towards the other portion of the housing;
a magnetic motor comprising:
a disc-shaped permanent magnet having a diameter and a height;
a disc-shaped pole piece having a diameter greater than said magnet disposed to cover one pole of said magnet with said magnet centered on and fixed to said pole piece; and
a cylindrical yoke having a diameter substantially equal to the diameter of said pole piece and a height substantially equal to the height of said magnet, the cylindrical yoke fixed to said pole piece so that the cylindrical yoke surrounds said magnet with a gap between the cylindrical yoke and said magnet;
an elastic suspension system rigidly coupled by an external region to a portion of the housing that faces the thermally conductive portion of the housing to which said coil is coupled, wherein the suspension system comprises at least two spiders comprising an internal region which is elastically coupled to the external region by at least two spaced apart flexible arms, wherein the internal regions of the at least two spiders are coupled together by a circular spacer connector which forms a circular aperture having an inside diameter substantially equivalent to the diameter of said pole piece so that the magnetic motor is inserted through and attached to said spacer connector;
wherein said coil is situated within the gap to electromagnetically couple with the magnetic motor to cause the motor to vibrate within the gap with the elastic suspension system transmitting vibrations to the housing;
the one or more the vibrating units, connected to a control box, the control box comprising a connection to a power supply, a processor and associated electronic memory, a communication interface, the processor and memory configured to perform the steps of:
accepting an input from a wireless remote control, the input associated with an action for at least one of the vibrating units; and
controlling the vibrating units to perform the action, wherein the wireless remote control comprises a wireless communication-enabled personal computing device of a user.

2. The massage device according to claim 1, further comprising:
one or more heating elements, and one or more lifting actuators, the one or more heating elements and lifting actuators connected to the control box,
the processor and memory further configured to perform the steps of:
accepting an input from the a wireless remote control, the input associated with an action for at least one of the heating elements or lifting actuators; and
controlling the heating elements or lifting actuators to perform the action.

3. The massage device according to claim 2, wherein the processor and memory are further configured to perform the steps of
accepting an input indicating that a pre-programmed pattern of massage control actions is to be performed from the remote control; and
controlling the vibrating units, the heating elements and lifting actuators to perform the actions according to the pre-programmed pattern.

4. The massage device according to claim 3, wherein the pre-programmed pattern of massage control actions is configured to be input by using a scripting language.

5. The massage device according to claim 1, wherein the remote control operates using control buttons.

6. The massage device according to claim 1, wherein the remote control operates using touch sensors.

7. The massage device according to claim 1, wherein the remote control comprises a smart phone device.

8. The massage device according to claim 1, wherein the remote control is a tablet device.

9. The massage device according to claim 1, wherein the remote control is a portable computing device.

10. The massage device according to claim 1, wherein the processor and memory are further configured to perform the steps of
accepting an input indicating that a pre-programmed pattern of massage control actions is to be performed from the remote control; and
controlling the vibrating units, to perform the actions according to the pre-programmed pattern.

11. The massage device according to claim 10, wherein the pre-programmed pattern of massage control actions is configured to be input by using the remote control device.

12. The massage device of claim 1, wherein the massage device is a chair having a back and the back comprises the pad.

13. A massage device comprising:
a pad comprising one or more vibrating units comprising:
a housing comprising a top portion and a bottom portion, wherein at least one of the portions is formed from a thermally conductive material;
a cylindrical electromagnetic coil mechanically and thermally coupled to a thermally conductive portion of the housing projecting towards the other portion of the housing;
a magnetic motor comprising:
a disc-shaped permanent magnet having a diameter and a height;
a disc-shaped pole piece having a diameter greater than said magnet disposed to cover one pole of said magnet with said magnet centered on and fixed to said pole piece; and
a cylindrical yoke having a diameter substantially equal to the diameter of said pole piece and a height substantially equal to the height of said magnet, the cylindrical yoke fixed to said pole piece so that the cylindrical yoke surrounds said magnet with a gap between the cylindrical yoke and said magnet;
an elastic suspension system rigidly coupled by an external region to a portion of the housing that faces the thermally conductive portion of the housing to which said coil is coupled, wherein the suspension system comprises at least two spiders comprising an internal region which is elastically coupled to the external region by at least two spaced apart flexible arms, wherein the internal regions of the at least two spiders are coupled together by a circular spacer connector which forms a circular aperture having an inside diameter substantially equivalent to the diameter of said pole piece so that the magnetic motor is inserted through and attached to said spacer connector;
wherein said coil is situated within the qap to electromagnetically couple with the magnetic motor to cause the motor to vibrate within the qap with the elastic suspension system transmitting vibrations to the housing;
the pad connected to a control box, one or more heating elements connected to the control box, and one or more lifting actuators connected to the control box, the control box comprising a connection to a power supply, a processor and associated electronic memory, a wired communication interface, the processor and memory configured to perform the steps of:
accepting an input from a wired remote control, the input associated with an action for at least one of the vibrating units;
controlling the vibrating units to perform the action;
accepting an input from the wired remote control, the input associated with an action for at least one of the heating elements or lifting actuators; and
controlling the heating elements or lifting actuators to perform the action.

14. The massage device according to claim 13, wherein the remote control operates using control buttons.

15. The massage device according to claim 13, wherein the remote control operates using touch sensors.

16. The massage device according to claim 15, wherein the pre-programmed pattern of massage control actions is configured to be input by using the wired remote control device.

17. The massage device according to claim 15, wherein the pre-programmed pattern of massage control actions is configured to be input by using a scripting language.

18. The massage device according to claim 15, wherein input of the pattern of massage control actions is performed using a personal computing device, the pattern of massage controls being provided to the control box by the personal computing device.

19. The massage device according to claim 13, wherein the processor and memory are further configured to perform the steps of
accepting an input indicating that a pre-programmed pattern of massage control actions is to be performed from the remote control;
controlling the vibrating units, heating elements or lifting actuators to perform the actions according to the pre-programmed pattern.

20. The massage device of claim 13, wherein the massage device is a chair having a back and the back comprises the pad.

* * * * *